United States Patent
Lee et al.

(10) Patent No.: US 7,321,584 B2
(45) Date of Patent: Jan. 22, 2008

(54) CELL SEARCH SYSTEM FOR MOBILE STATION IN TIME DIVISION DUPLEX SYSTEM AND METHOD FOR THE SAME

(75) Inventors: Yu-Ro Lee, Daejeon (KR); Dong-Seung Kwon, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1142 days.

(21) Appl. No.: 10/256,935

(22) Filed: Sep. 27, 2002

(65) Prior Publication Data

US 2003/0086401 A1   May 8, 2003

(30) Foreign Application Priority Data

Oct. 25, 2001   (KR) ............................ 2001-0065989

(51) Int. Cl.
*H04J 3/06* (2006.01)
(52) U.S. Cl. ...................... 370/350; 370/509; 455/525
(58) Field of Classification Search ................ 370/324, 370/337, 350, 503, 507, 509, 510–514; 455/501, 455/502, 525; 375/145, 149, 356, 365–368
See application file for complete search history.

(56) References Cited

U.S. PATENT DOCUMENTS

| | | | | |
|---|---|---|---|---|
| 7,076,262 | B1 * | 7/2006 | Bhatoolaul et al. | 455/522 |
| 7,102,994 | B2 * | 9/2006 | Sezgin et al. | 370/209 |
| 7,158,505 | B2 * | 1/2007 | Dick et al. | 370/350 |

FOREIGN PATENT DOCUMENTS

| | | |
|---|---|---|
| EP | 1 154 662 A1 | 11/2001 |
| JP | 10-126380 | 5/1998 |
| JP | 2001-160798 | 6/2001 |
| WO | 1020000067168 | 11/2000 |
| WO | WO 0067396 | 11/2000 |
| WO | WO 00/74276 | 12/2000 |
| WO | WO 01/015696 | 1/2001 |

OTHER PUBLICATIONS

Universal Mobile Telecommunications System (UMTS), Physical Layer Procedures (TDD), 3GPP TS 25.224 version 4.1.0 Release Jul. 4, 2001.*
2000, IEEE, Design of Cyclically Permutable Codes for PN Code Acquiaition in WCDMA TDD Mode, pp. 581-587.
2000 IEEE, Experimental Evaluation of 3-Step Cell Search Method in W-CDMA Mobile Radio, pp. 303-307.

* cited by examiner

*Primary Examiner*—Doris H. To
*Assistant Examiner*—Habte Mered
(74) *Attorney, Agent, or Firm*—Blakely, Sokoloff, Taylor & Zafman (57) ABSTRACT

A cell search system for a mobile station in a time division duplex system includes: a primary synchronization code search module for searching primary synchronization codes and comparing frame values of the primary synchronization codes to determine a position of the maximum value; a correlation module for estimating a phase value and acquiring a first correlation value; a secondary synchronization code search module for generating determinative variables and storing them based on the position of the maximum value; a comparison and decision module for detecting a maximum value of the determinative variables, comparing it with the values stored in the secondary synchronization code search module to count matching values, and comparing the count value with a system value to decide whether slot synchronization and group acquisition is successful; and a base station determination module for determining a second correlation value between midamble codes and the received signals, and selecting a maximum value of it to determine a base station.

13 Claims, 5 Drawing Sheets

FIG.1

$b_i \varepsilon \{\pm 1, \pm j\}$, $C_{s,i} \varepsilon \{C_0, C_1, C_3, C_4, C_5, C_6, C_8, C_{10}, C_{12}, C_{13}, C_{14}, C_{15}\}$, $i=1,2,3$

CELL SEARCH SYSTEM FOR MOBILE STATION IN TIME DIVISION DUPLEX SYSTEM AND METHOD FOR THE SAME

BACKGROUND OF THE INVENTION (a) Field of the Invention

The present invention relates to a cell search system for a mobile station in a time division duplex system, and a method for the same. More specifically, the present invention relates to a cell search system for a mobile station in a time division duplex system and a method for the same in which the mobile station searches secondary synchronization codes for initial synchronization acquisition without determining a threshold value in the system, and then enters the checking mode, thereby reducing the initial synchronization acquisition time.

(b) Description of the Related Art

In a time division duplex (TDD) system, the same frequency is used in transmitting and receiving data. The TDD system employs a time division multiple access method in which each 10 ms long frame is divided into 15 time slots to be shared among multiple users. The TDD system is one of the wireless access standards for IMT-2000 using a code division multiple access method to support multiple simultaneous users.

An advantage of the TDD system is that it is capable of adapting to determine the direction of data communications so as to provide asymmetric data services such as Internet efficiently, in the aspect of frequency.

Figure 1:
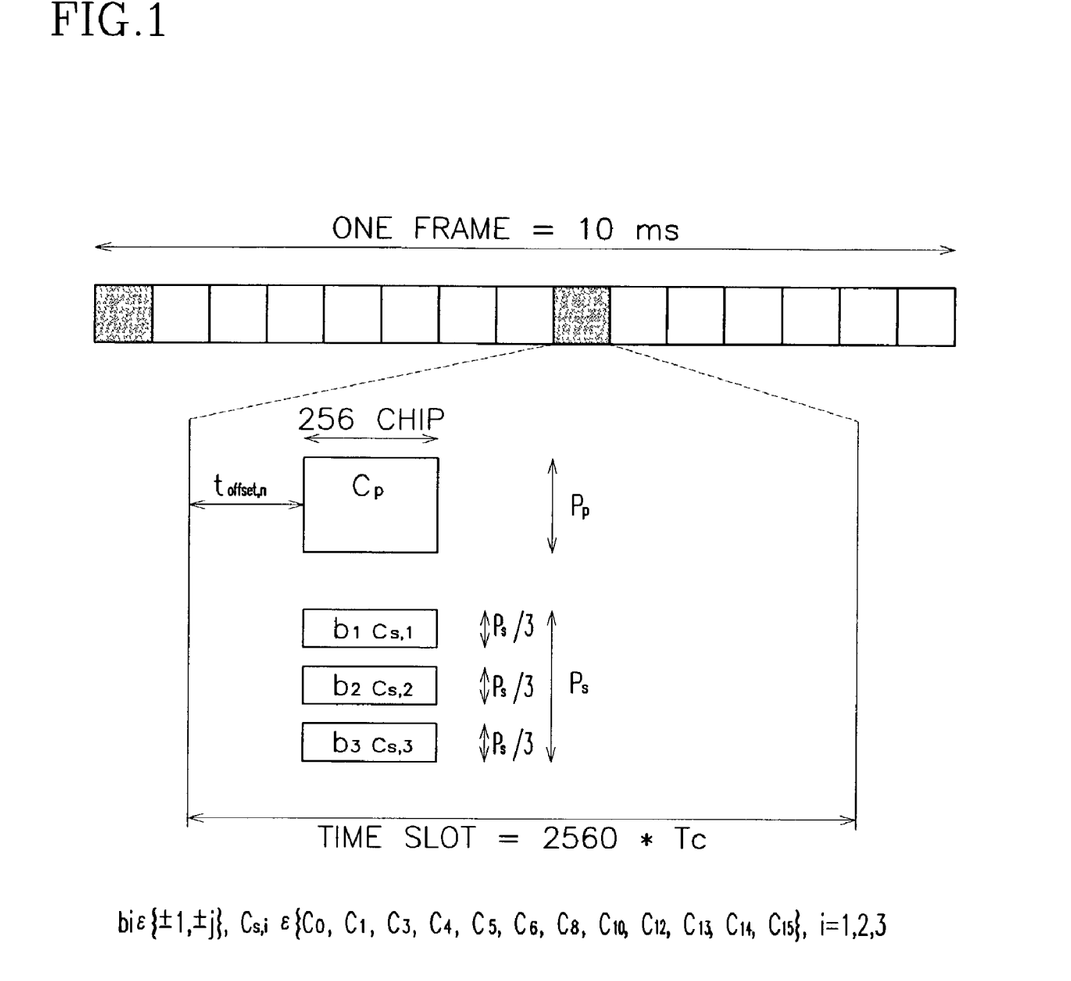
FIG. 1 is an illustration showing a sync channel configuration in a general time division duplex (TDD) system.

FIG. 1 is an illustration of a sync channel configuration in a general TDD system.

In the TDD system, base stations send sync channels for each frame, as shown in FIG. 1, so that the mobile station performs an initial synchronization search.

The sync channel configuration shown in FIG. 1 is an example of the current standards in the TDD system. The sync channel is classified into primary synchronization codes (PSC) and secondary synchronization codes (SSC), and carries one PSC and three SSCs, each having a length of 256 on two slots per frame.

In FIG. 1, one frame consists of 15 slots having a length of 10 ms, and $P_P$ and $P_S$ are the code powers of the PSC and the SSC, respectively.

Figure 2:
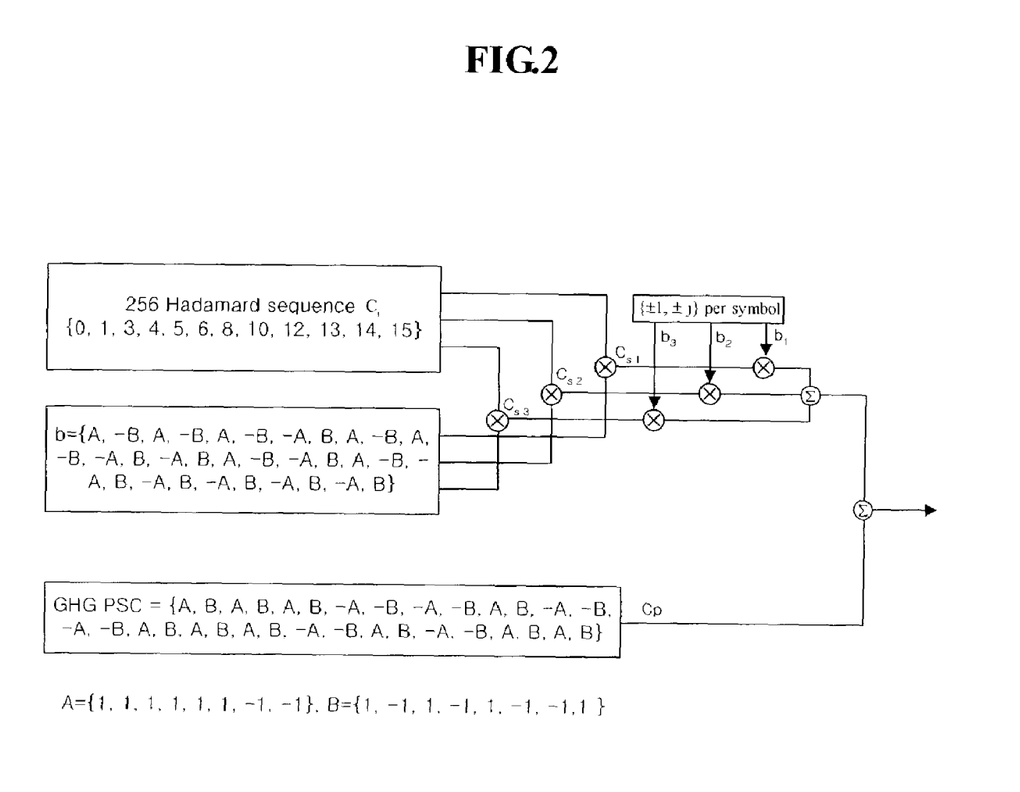
FIG. 2 is an illustration showing an example of the code structure forming the sync channel of FIG. 1.

FIG. 2 shows an example of the code structure forming the sync channel of FIG. 1.

In the code structure of PSC $C_P$ and SSC $C_S$ as shown in FIG. 2, the position of the sync channel, if carried on two slots per frame and starting from slot k, is slots k, k+8, k+15, and k+23.

The SSCs are generated by multiplexing a 256-cycle Hadamard sequence by a 256-length code consisting of a combination of 8-length codes A=$\{1, 1, 1, 1, 1, 1, -1, -1\}$ and B=$\{1, -1, 1, -1, 1, -1, -1, 1\}$ and modulating $\{\pm 1, \pm j\}$ every 256-length code.

The SSCs are generalized hierarchical Golay (GHG) codes, and they are constructed as a combination of A and B, as illustrated in FIG. 2.

Table 1 shows an example of SSCs modulated according to groups and slots. Three SSCs are modulated by $\{\pm 1, \pm j\}$ and, as illustrated in FIG. 2, transmitted twice every frame, the same SSC being repeated every two frames.

TABLE 1

| Code Group | Code Set | Frame 1 Slot k | | | Frame 1 Slot k + 8 | | | Frame 2 Slot k | | | Frame 2 Slot k + 8 | | | $t_{offset}$ |
|---|---|---|---|---|---|---|---|---|---|---|---|---|---|---|
| 0 | 1 | $C_1$ | $C_3$ | $C_5$ | $C_1$ | $C_3$ | $-C_5$ | $-C_1$ | $-C_3$ | $C_5$ | $-C_1$ | $-C_3$ | $-C_5$ | $t_0$ |
| 1 | 1 | $C_1$ | $-C_3$ | $C_5$ | $C_1$ | $-C_3$ | $-C_5$ | $-C_1$ | $C_3$ | $C_5$ | $-C_1$ | $C_3$ | $-C_5$ | $t_1$ |
| 2 | 1 | $jC_1$ | $jC_3$ | $C_5$ | $jC_1$ | $jC_3$ | $-C_5$ | $-jC_1$ | $-jC_3$ | $C_5$ | $-jC_1$ | $-jC_3$ | $-C_5$ | $t_2$ |
| 3 | 1 | $jC_1$ | $-jC_3$ | $C_5$ | $jC_1$ | $-jC_3$ | $-C_5$ | $-jC_1$ | $jC_3$ | $C_5-$ | $jC_1$ | $jC_3$ | $-C_5$ | $t_3$ |
| 4 | 1 | $jC_1$ | $jC_5$ | $C_3$ | $jC_1$ | $jC_5$ | $-C_3$ | $-jC_1$ | $-jC_5$ | $C_3$ | $-jC_1$ | $-jC_5$ | $-C_3$ | $t_4$ |
| 5 | 1 | $jC_1$ | $-jC_5$ | $C_3$ | $jC_1$ | $-jC_5$ | $-C_3$ | $-jC_1$ | $jC_5$ | $C_3$ | $-jC_1$ | $jC_5$ | $-C_3$ | $t_5$ |
| 6 | 1 | $jC_3$ | $jC_5$ | $C_1$ | $jC_3$ | $jC_5$ | $-C_1$ | $-jC_3$ | $-jC_5$ | $C_1$ | $-jC_3$ | $-jC_5$ | $-C_1$ | $t_6$ |
| 7 | 1 | $jC_3$ | $-jC_5$ | $C_1$ | $jC_3$ | $-jC_5$ | $-C_1$ | $-jC_3$ | $jC_5$ | $C_1$ | $-jC_3$ | $jC_5$ | $-C_1$ | $t_7$ |
| 8 | 2 | $C_{10}$ | $C_{13}$ | $C_1$ | $C_{10}$ | $C_{13}$ | $-C_{14}$ | $-C_{10}$ | $-C_{13}$ | $C_{14}$ | $-C_{10}$ | $C_{13}$ | $-C_{14}$ | $t_8$ |
| 9 | 2 | $C_{10}$ | $-C_{13}$ | $C_1$ | $C_{10}$ | $-C_{13}$ | $-C_{14}$ | $-C_1$ | $_0C_{13}$ | $C_{14}$ | $-C_{10}$ | $C_{13}$ | $-C_{14}$ | $t_9$ |
| 10 | 2 | $jC_{10}$ | $jC_{13}$ | $C_{14}$ | $jC_{10}$ | $jC_{13}$ | $-C_{14}$ | $-jC_{10}$ | $-jC_{13}$ | $C_{14}$ | $-jC_{10}$ | $-jC_{13}$ | $-C_{14}$ | $t_{10}$ |
| 11 | 2 | $jC_{10}$ | $-jC_{13}$ | $C_{14}$ | $jC_{10}$ | $-jC_{13}$ | $-C_{14}$ | $-jC_{10}$ | $jC_{13}$ | $C_{14}$ | $-jC_{10}$ | $jC_{13}$ | $-C_{14}$ | $t_{11}$ |
| 12 | 2 | $jC_{10}$ | $jC_{14}$ | $C_{13}$ | $jC_{10}$ | $jC_{14}$ | $-C_{13}$ | $-jC_{10}$ | $-jC_{14}$ | $C_{13}$ | $-jC_{10}$ | $-jC_{14}$ | $-C_{13}$ | $t_{12}$ |
| 13 | 2 | $jC_{10}$ | $-jC_{14}$ | $C_{13}$ | $jC_{10}$ | $-jC_{14}$ | $-C_{13}$ | $-jC_{10}$ | $jC_{14}$ | $C_{13}$ | $-jC_{10}$ | $jC_{14}$ | $-C_{13}$ | $t_{13}$ |
| 14 | 2 | $jC_{13}$ | $jC_{14}$ | $C_{10}$ | $jC_{13}$ | $jC_{14}$ | $-C_{10}$ | $-jC_{13}$ | $-jC_{14}$ | $C_{10}$ | $-jC_{13}$ | $-jC_{14}$ | $-C_{10}$ | $t_{14}$ |
| 15 | 2 | $jC_{13}$ | $-jC_{14}$ | $C_{10}$ | $jC_{13}$ | $-jC_{14}$ | $-C_{10}$ | $-jC_{13}$ | $jC_{14}$ | $C_{10}$ | $-jC_{13}$ | $jC_{14}$ | $-C_{10}$ | $t_{15}$ |
| 16 | 3 | $C_0$ | $C_6$ | $C_{12}$ | $C_0$ | $C_6$ | $-C_{12}$ | $-C_0$ | $-C_6$ | $C_{12}$ | $-C_0$ | $-C_6$ | $-C_{12}$ | $t_{16}$ |
| 23 | 3 | $jC_6$ | $-jC_{12}$ | $C_0$ | $jC_6$ | $-jC_{12}$ | $-C_0$ | $-jC_6$ | $jC_{12}$ | $C_0$ | $-jC_6$ | $jC_{12}$ | $-C_0$ | $t_{20}$ |
| 24 | 4 | $C_4$ | $C_8$ | $C_{15}$ | $C_4$ | $C_8$ | $-C_{15}$ | $-C_4$ | $-C_8$ | $C_{15}$ | $-C_4$ | $-C_8$ | $-C_{15}$ | $t_{24}$ |
| 31 | 4 | $jC_8$ | $-jC_{15}$ | $C_4$ | $jC_8$ | $-jC_{15}$ | $-C_4$ | $-jC_8$ | $jC_{15}$ | $C_4$ | $-jC_8$ | $jC_{15}$ | $-C_4$ | $t_{31}$ |

Figure 3:
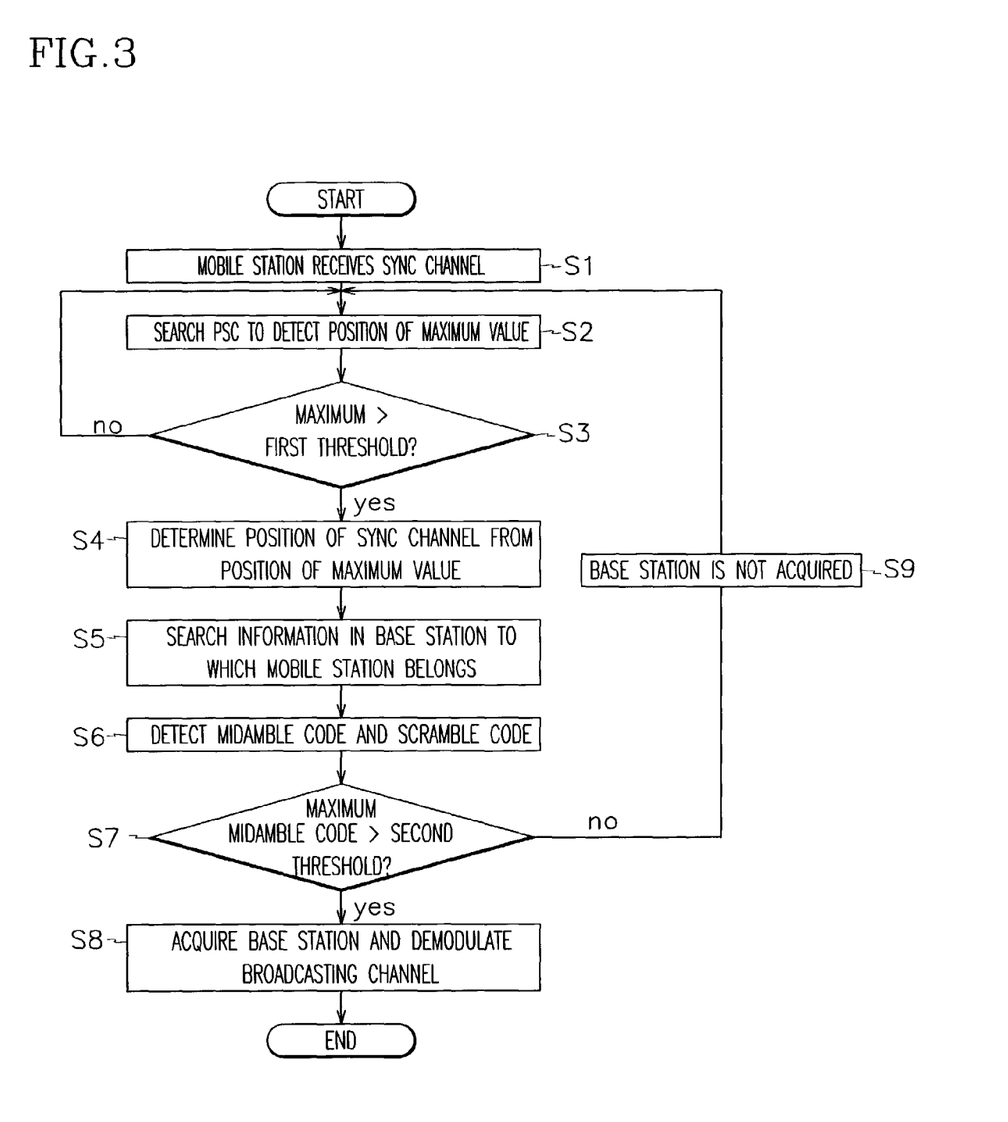
FIG. 3 is a flow chart showing a cell search method for a mobile station in a TDD system according to an example of the prior art.

FIG. 3 is a flow chart showing a cell search method for a mobile station in a TDD system according to an example of the prior art.

As shown in FIG. 3, upon receiving a sync channel, in step 1, the mobile station searches PSCs with a matcher to detect a maximum value of PSCs, in step 2.

The mobile station decides in step 3 whether the maximum value exceeds a first threshold predetermined in the system. When the maximum value does not exceed the first threshold, the mobile station searches PSCs again; otherwise, when the maximum value exceeds the first threshold, the mobile station determines the position of the maximum value as that of the sync channel, in step 4.

Using the position of the sync channel and SSCs, the mobile station searches information, such as the group of the base station to which it belongs, slot boundary, and the position of the sync channel in the frame, in step 5.

The mobile station uses the information about the group to which it belongs to get the knowledge of four predetermined midamble codes and scramble codes, in step 6. Then the mobile station selects a maximum value of the four midamble codes and decides in step 7 whether the maximum midamble code exceeds a second threshold predetermined in the system.

When the maximum midamble code exceeds the second threshold, the mobile station decides that it has acquired its base station, and detects the scramble codes from the selected midamble code to demodulate broadcasting channels from the scramble codes, in step 8.

When the maximum midamble code does not exceed the second threshold, the mobile station decides that it has failed to acquire its base station, and searches PSCs again, in step 9.

The base station search method for the mobile station as described above has a problem in that it is difficult to accurately determine the threshold values for the PSC search, because the power of the received signal dramatically changes due to channel environments when the mobile station receives the signals from the base station.

This difficulty in determining the accurate threshold values for the PSC search causes an increase in the probability of false alarms or defectives according to the threshold values for the PSC search, and increases the cell search time.

SUMMARY OF THE INVENTION

It is an object of the present invention to solve the problems with the prior art and to provide a cell search system for a mobile station in a time division duplex system, and a method for the same, in which the mobile station searches secondary synchronization codes without the system's determining a threshold value and then enters the checking mode to decide whether or not synchronization is acquired, thereby reducing the time required for searching for its base station.

To achieve the object of the present invention, a cell search system for a mobile station in a time division duplex system is provided that includes: a primary synchronization code search module for searching primary synchronization codes for a predetermined search frame using received signals from a base station and generated primary synchronization codes, and comparing frame values of the primary synchronization codes to determine a position of the maximum value; a correlation module for estimating a phase value necessary for demodulation of secondary synchronization codes from the primary synchronization codes searched by the primary synchronization code search module, and detecting a correlation between the received signals and codes forming the secondary synchronization codes using the estimated phase value and the position of the maximum value determined by the primary synchronization code search module to acquire a first correlation value; a secondary synchronization code search module for generating determinative variables using the first correlation value of the correlation module, accumulating M slots based on the position of the maximum value, sorting, in the order of size, as many of the determinative variables of the respective M slots as can be sorted in a predetermined buffer size, and storing the sorted determinative variables; a comparison and decision module for detecting a maximum value of the determinative variables of the secondary synchronization code search module, comparing the maximum variable value with the values stored in the secondary synchronization code search module to count matching values, and comparing the count value with a predetermined system value to decide whether slot synchronization and group acquisition is successful; and a base station determination module for detecting a correlation between the received signals and midamble codes in the group generated according to the decision result of the comparison and decision module to determine a second correlation value, and selecting a maximum of the second correlation values to determine the base station to which the mobile station belongs.

The cell search system further includes a channel demodulation module for searching scramble codes according to the midamble codes to demodulate broadcasting channels, upon the base station determination module determining the base station.

The primary synchronization code search module includes: a primary synchronization code generator for generating primary synchronization codes; a matcher for loading the primary synchronization code values generated from the primary synchronization code generator for a predetermined search frame, and for matching the respective primary synchronization code values with the received signal to output a predetermined number of output values for the search frame; and a first comparator for comparing the output values of the matcher to detect the position of the maximum value.

The correlation module includes: a phase estimator for estimating a phase for modulating the secondary synchronization codes from the primary synchronization codes; a secondary synchronization code generator for generating extension codes forming the secondary synchronization codes; and a first correlator for detecting a correlation between the extension codes of the secondary synchronization code generator and the received signals using the position of the maximum value from the primary synchronization code search module and the phase value estimated by the correlation module to determine the first correlation value, and for integrating the first correlation value.

The secondary synchronization code search module includes: a Hadamard converter for Hadamard-converting the correlation values of the correlation module; a code cell storage section for storing the secondary synchronization codes modulated according to information about the group to which the mobile station belongs; a calculator for operating the output values of the Hadamard converter and the modulated secondary synchronization code values from the code cell storage section to generate determinative variables; an accumulator for accumulating M slots determined according to the sync channels per search frame based on the position of the maximum value selected by the primary synchronization code search module; and a comparison and storage section for storing, in the order of size, as many of the determinative variables of the respective M slots as can be stored in a predetermined buffer size.

The comparison and decision module includes: a detector for detecting a maximum value of the determinative variables generated from the secondary synchronization code search module; a second comparator for comparing the values stored in the secondary synchronization code search module with the maximum value of the determinative variables from the detector to count matching values; and a decider for comparing the count value of the second comparator with a predetermined system value to decide whether slot synchronization and group acquisition is successful.

The base station determination module includes: a midamble code generator for generating midamble codes in the group when the comparison and decision module decides that slot synchronization and group acquisition is successful; a second correlator for detecting a correlation between the midamble codes generated from the midamble code generator and the received signals to output second correlation values; and a maximum value detector for detecting a maximum value of the second correlation values from the correlator to determine the base station to which the mobile station belongs.

The comparison and decision module sends a command to the primary synchronization code search module to search the primary synchronization codes again, when slot synchronization and group acquisition is not successful.

In another aspect of the present invention, there is provided a cell search method for a mobile station in a time division duplex system that includes: (a) upon turning on power, the mobile station's searching for a base station to which it belongs, and searching primary synchronization codes for a predetermined search frame to determine a position of the maximum value during the search frame; (b) the mobile station's extracting M slots from the position of the maximum value determined in the step (a), searching and accumulating secondary synchronization codes for M slots, sorting, in the order of size, as many of the secondary synchronization codes as can be sorted in a predetermined buffer size per slot, and storing the sorted secondary synchronization codes; (c) determining a position of the maximum variable among the secondary synchronization code values accumulated in the step (b), and counting matching position values in the M slots having the maximum variables sorted in the order of size; (d) comparing the count value of the step (c) with a predetermined system value to decide whether slot synchronization and group acquisition is successful; and (e) searching midamble codes from the group determined by the secondary synchronization code search and detecting a maximum value of the midamble codes to determine the base station to which the mobile station belongs, when slot synchronization and group acquisition is successful.

The cell search method further includes: (f) performing a primary synchronization code search again, when slot synchronization and group acquisition is not successful.

The step (d) includes: deciding that slot synchronization and group acquisition is successful, when the count value of the step (c) is equal to or greater than the system value; and deciding that slot synchronization and group acquisition is not successful, when the count value of the step (c) is less than the system value.

The step (e) includes: searching scramble codes from the midamble codes and demodulating broadcasting channels using the scramble codes.

The step of demodulating the broadcasting channels includes: performing a cyclic redundancy check (CRC) of the demodulated broadcasting channels to decide whether there is an error; and performing a primary synchronization code search again when there is an error, or deciding that the base station search is successful and ending the search process when there is no error.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

In the IMT-2000 broadband TDD mode, each base station has a unique scramble code, in which case it takes too much time for the mobile station to acquire the initial synchronization. Hence, base stations in the broadband TDD mode use sync channels.

In the case of using sync channels, the mobile station acquires slot synchronization with a group of base stations including the base station to which it belongs, and searches midamble codes in the group to determine its base station.

Figure 4:
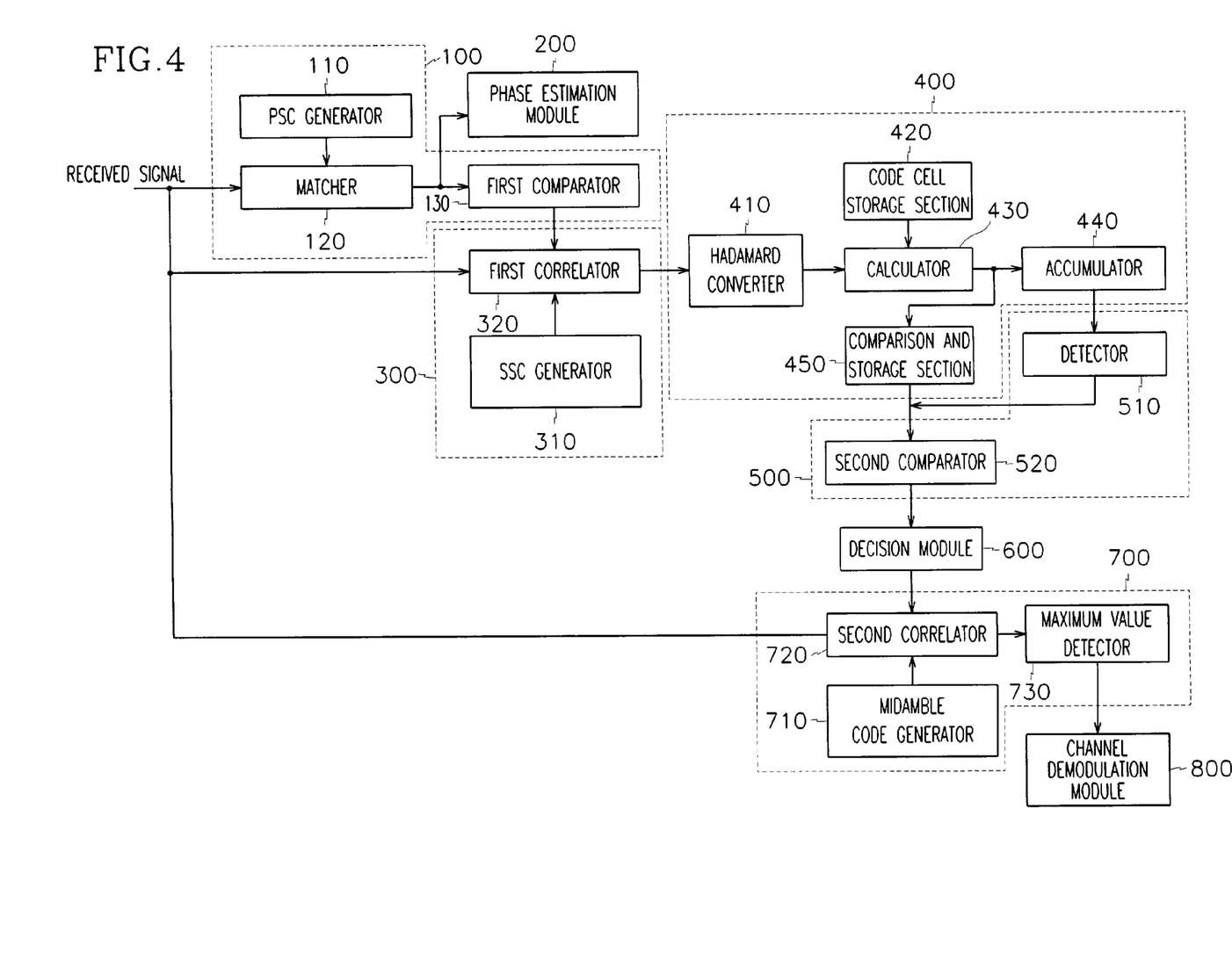
FIG. 4 is a block diagram showing a base station search system for a mobile station in a TDD system according to an embodiment of the present invention.

FIG. 4 is a block diagram showing a base station search system for a mobile station in a TDD system according to an embodiment of the present invention.

The system according to the embodiment of the present invention comprises, as shown in FIG. 4, a primary synchronization code (PSC) search module 100, a phase estimator 200, a correlation module 300, a secondary synchronization code (SSC) search module 400, a comparison and decision module 500, a decider 600, a base station determination module 700, and a channel demodulation module 800.

The PSC search module 100 searches PSCs for L search frames, and compares the frame values from the respective PSCs to select a position of the maximum value $P_{max}$. The phase estimator 200 estimates a phase necessary for demodulating SSCs modulated by $\{\pm 1, \pm j\}$ from the PSCs detected by the PSC search module 100.

The correlation module 300 uses the position of the maximum value $P_{max}$ detected by the PSC search module 100 and the phase value estimated by the phase estimator 200 to detect a correlation between received signals and codes forming SSCs and to determine a first correlation value.

The SSC search module 400 generates determinative variables using the first correlation value of the correlation module 300 and accumulates M slots based on the position of the maximum value $P_{max}$ to sort, in the order of size, as many of the determinative variables of the respective M slots as can be sorted in a predetermined buffer size.

The comparison and decision module 500 detects the maximum value $D_{max}$ of the determinative variables from the SSC search module 400 and compares the maximum value $D_{max}$ with the values stored in the SSC search module 400 to count matching values. The decider 600 compares the count value of the comparison and decision module 500 with a predetermined system value to decide whether or not slot synchronization and group acquisition is successful.

The base station determination module 700 detects a correlation between the midamble codes in the group generated according to the output of the decider 600 and received signals to calculate a second correlation value, and selects a maximum of the second correlation values to determine the base station to which the mobile station belongs. Upon the base determination module 700 determining the base station, the channel demodulation module 800 searches scramble codes according to the midambles and demodulates broadcasting channels.

The PSC search module 100 comprises: a PSC generator 110 for generating PSCs; a matcher 120 for loading all PSC values from the PSC generator 110 for a search frame and matching the respective PSC values with the received signals to output L frame values; and a first comparator 130 for comparing the frame values from the matcher 120 to detect a position of the maximum value $P_{max}$.

If the mobile station transmits sync channels for two slots per frame and searches two frames (L=2), as an example, four PSCs are generated for two frames, and the position of the maximum value $P_{max}$ is one of the positions of the four PSCs when the mobile station accurately acquires synchronization of PSCs.

The correlation module 300 comprises: a SSC generator 310 for generating codes {A, B} forming SSCs, i.e., extension codes; and a first correlator 320 for detecting a correlation between the extension codes of the SSC generator 310 and received signals using the position of the maximum value $P_{max}$ of the first comparator 130 and the phase value estimated by the phase estimator 200 to detect a first correlation value, and for accumulating a part of the first correlation values.

The SSC search module 400 comprises: a Hadamard converter 410 for performing a high-speed 16-cycle Hadamard conversion of the first correlation values from the first correlator 320 to generate 16 output values; a code cell storage section 420 for storing the SSCs used for determination of the groups and slots and which are modulated according to the information about the group to which the mobile station belongs; a calculator 430 for performing multiplication and addition using the output values of the Hadamard converter 410 and the modulated SSCs of the code cell storage section 420 to generate determinative variables; an accumulator 440 for accumulating M slots determined according to the sync channel per search frame based on the position of the maximum value $P_{max}$ from the first comparator 130; and a comparison and storage section 450 for storing, in the order of size, as many B determinative variables of the respective M slots as can be sorted in a predetermined buffer size.

The comparison and storage section 450, which is to store B determinative variables for the respective M slots for SSC search in the order of size, may be an M×B memory.

Referring to Table 1, there are twelve SSCs: $C_0$, $C_1$, $C_2$, $C_3$, $C_4$, $C_5$, $C_6$, $C_8$, $C_{10}$, $C_{13}$, $C_{14}$, and $C_{15}$. Each of the 4 slots in the respective 32 groups has three modulated SSCs. 128 determinative variables are generated when performing multiplication and addition using these SSC values and the 16 output values of the Hadamard converter.

When the search interval is two frames and two sync channels exist every frame, M=4. In this case, the positions of the sync channels detected from the position of the maximum value $P_{max}$ for L search frames are slots {0, 8, 15, 23} or {0, 7, 15, 22}. Hence, the number of determinative variables generated from the accumulator 440 accumulating M slots is 256 (=128+128).

The comparison and decision module 500 comprises: a detector 510 for detecting the maximum value $D_{max}$ of the determinative variables from the accumulator 440; and a second comparator 520 for comparing the B values stored in the comparison and storage section 450 with the maximum value $D_{max}$ of the detector 510 to count matching values.

At M=4, the system value is 1, 2, 3, or 4. Hence when the count value of the second comparator 520 is equal to or greater than the system value, the decider 600 decides that slot synchronization and group acquisition is successful.

Otherwise, when the count value is less than the system value, the decider 600 decides that slot synchronization and group acquisition is not successful, and sends a command to the PSC search module 100 to perform a PSC search again.

For example, if 35 is the maximum value of the determinative variables after searching M slots while accumulating slots {0, 8, 15, 23} from the position of the maximum value $P_{max}$, there are 8 groups and 3 slots.

When M=4, B=5, and the stored values of the respective M slots are {0, 8, 15, 23} from the position of the maximum value $P_{max}$, B={18, 50, 48, 35, 70} at M=1; B={112, 40, 110, 93, 43} at M=2; B={35, 67, 88, 10, 50} at M=3; or B={89, 15, 49, 150, 35} at M=4.

For the slots including the maximum value of 35 when accumulating M slots, M is 1, 3, or 4. When the count value of the second comparator is 3 and the system value is 2, that is, the count value is greater than the system value, the decider 600 decides that slot synchronization and group acquisition is successful.

The base station determination module 700 comprises: a midamble code generator 710 for generating midamble codes in the group upon the decider 600 deciding that slot synchronization and group acquisition is successful; a second correlator 720 for detecting a correlation between the midamble codes generated from the midamble code generator 710 and the received signals to output second correlation values; and a maximum value detector 730 for detecting a maximum of the second correlation values from the second correlator 720 to determine the base station to which the mobile station belongs.

In the case of 32 groups and 128 base stations, for example, there are four base stations in each group. When a group is selected, the second correlator 720 detects a correlation among the four midamble codes, and the maximum detector 730 selects a maximum of the correlation values to determine the base station to which the mobile station belongs.

In the case where the mobile station determines its base station by a midamble code search, the channel demodulation module 800 having the knowledge of the scramble codes according to the midamble codes demodulates broadcasting channels.

Now, a description will be given to an operation of the cell search system for a mobile station in a TDD system according to an embodiment of the present invention in detail with reference to the accompanying drawing.

Figure 5:
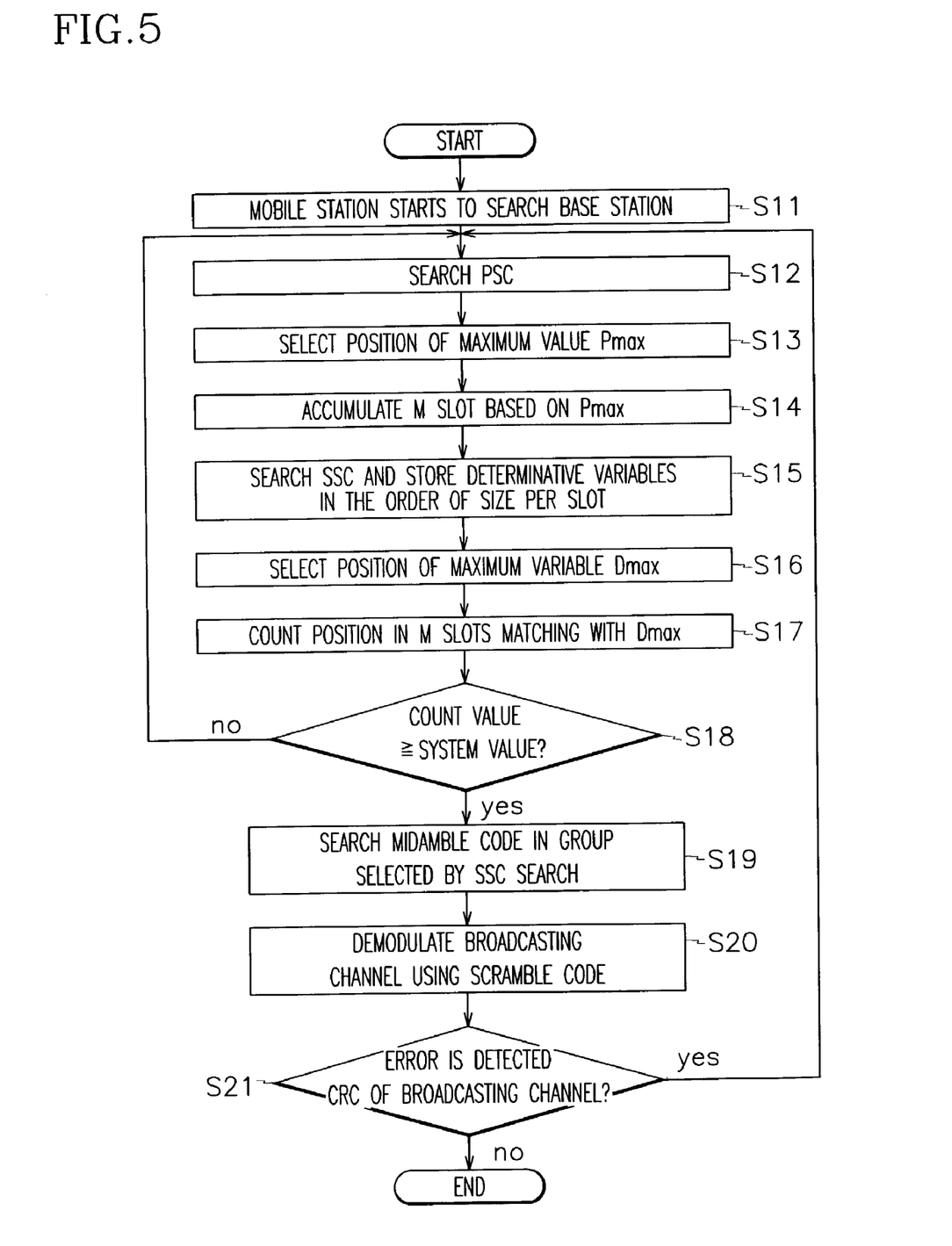
FIG. 5 is a flow chart showing a cell search method for a mobile station in a TDD system according to an embodiment of the present invention.

FIG. 5 is a flow chart showing a cell search method for a mobile station in a TDD system according to an embodiment of the present invention.

As shown in FIG. 5, in the method of the present invention, the mobile station turns on the power and starts to search the base station to which it belongs, in step 11. The mobile station searches PSCs using the PSC search module 100 for a predetermined search frame (L frames), in step 12.

The PSC search module 100 determines a position of the maximum value $P_{max}$ during the PSC search interval, in step 13. The mobile station has the SSC search module 400, via the phase estimator 200 and the correlation module 300, search SSCs from the position of the maximum value determined by the PSC search module 100 for M slots and accumulate the values of the SSCs, in step 14. Then the mobile station sorts, in the order of size, as many B determinative variables for the respective M slots as can be sorted in a predetermined buffer size and stores them, in step 15.

The comparison and decision module 500 detects a position of the maximum variable $D_{max}$ among the determinative variables accumulated in the SSC search module 400, in step 16, and counts the position of the maximum variable in the M slots having the maximum variables sorted in the order of size, in step 17.

The decider 600 decides whether or not the count value of the comparison and decision module 500 is equal to or greater than a predetermined system value, in step 18. With the count value being less than the system value, the mobile station returns to the PSC search step.

When the count value is equal to or greater than the system value, the base station determination module 700 searches the midamble codes in the group selected by a SSC search to determine a maximum value of the midamble codes, in step 19.

Using scramble codes detected from the maximum midamble code, the channel demodulation module 800 demodulates broadcasting channels, in step 20.

Then the mobile station performs a cyclic redundancy check (CRC) to examine whether the demodulated broadcasting channels have CRC errors, in step 21. With the CRC errors in the broadcasting channels, the mobile station performs the PSC search again; otherwise, without the CRC errors, the mobile station decides that the base station search is successful and ends it.

According to the embodiment of the present invention, the mobile station searches sync channels in the initial synchronization acquisition step and then enters the checking mode, thereby reducing the initial synchronization acquisition time.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, according to the present invention, the mobile station searches secondary synchronization codes without the system determining threshold values, checks the presence of errors to decide whether or not synchronization acquisition is successful, and searches primary synchronization codes again when slot synchronization and group acquisition is not successful, or searches midamble codes when slot synchronization and group acquisition is successful, thereby reducing the base station search time in the wireless channel environments where the received power is extremely variable.

What is claimed is:

1. A cell search system for a mobile station in a time division duplex system, comprising:
    a primary synchronization code search module for searching primary synchronization codes for a predetermined search frame using received signals from a base station and generated primary synchronization codes, and comparing frame values of the primary synchronization codes to determine a position of the maximum value;
    a correlation module for estimating a phase value necessary for demodulation of secondary synchronization codes from the primary synchronization codes searched by the primary synchronization code search module, and detecting a correlation between the received signals and codes forming the secondary synchronization codes using the estimated phase value and the position of the maximum value determined by the primary synchronization code search module to acquire a first correlation value;
    a secondary synchronization code search module for generating determinative variables using the first correlation value of the correlation module, accumulating M slots based on the position of the maximum value, sorting, in the order of size, as many of the determinative variables of the respective M slots as can be sorted in a predetermined buffer size, and storing the sorted determinative variables;
    a comparison and decision module for detecting a maximum value of the determinative variables of the secondary synchronization code search module, comparing the maximum variable value with the values stored in the secondary synchronization code search module to count matching values, and comparing the counted value with a predetermined system value to decide whether slot synchronization and group acquisition is successful; and
    a base station determination module for detecting a correlation between the received signals and midamble codes in the group generated according to the decision result of the comparison and decision module to determine a second correlation value, and selecting a maximum of the second correlation values to determine the base station to which the mobile stations belongs,
    wherein the mobile station operates to search primary and secondary synchronization codes during initial acquisition without determining threshold values before entering checking mode to determine if synchronization is acquired, searches primary synchronization codes again when slot synchronization and group acquisition is not successful, and searches midamble codes only when slot synchronization and group acquisition is successful.

2. The system as claimed in claim 1, further comprising a channel demodulation module for searching scramble codes according to the midamble codes to demodulate broadcasting channels, upon the base station determination module determining the base station.

3. The system as claimed in claim 1, wherein the primary synchronization code search module comprises:
    a primary synchronization code generator for generating primary synchronization codes;
    a matcher for loading the primary synchronization code values generated from the primary synchronization code generator for a predetermined search frame, and for matching the respective primary synchronization code values with the received signal to output a predetermined number of output values for the search frame; and
    a first comparator for comparing the output values of the matcher to detect the position of the maximum value.

4. The system as claimed in claim 1, wherein the correlation module comprises:
    a phase estimator for estimating a phase for modulating the secondary synchronization codes from the primary synchronization codes;
    a secondary synchronization code generator for generating extension codes forming the secondary synchronization codes; and
    a first correlator for detecting a correlation between the extension codes of the secondary synchronization code generator and the received signals using the position of the maximum value from the primary synchronization code search module and the phase value estimated by the correlation module to determine the first correlation value, and for integrating the first correlation value.

5. The system as claimed in claim 1, wherein the secondary synchronization code search module comprises:
   a Hadamard converter for Hadamard-converting the correlation values of the correlation module;
   a code cell storage section for storing the secondary synchronization codes modulated according to information about the group to which the mobile station belongs;
   a calculator for operating the output values of the Hadamard converter and the modulated secondary synchronization code values from the code cell storage section to generate determinative variables;
   an accumulator for accumulating M slots determined according to the sync channels per search frame based on the position of the maximum value selected by the primary synchronization code search module; and
   a comparison and storage section for storing, in the order of size, as many of the determinative variables of the respective M slots as can be stored in a predetermined buffer size.

6. The system as claimed in claim 1, wherein the comparison and decision module comprises:
   a detector for detecting a maximum value of the determinative variables generated from the secondary synchronization code search module;
   a second comparator for comparing the values stored in the secondary synchronization code search module with the maximum value of the determinative variables from the detector to count matching values; and
   a decider for comparing the counted value of the second comparator with a predetermined system value to decide whether slot synchronization and group acquisition is successful.

7. The system as claimed in claim 1, wherein the base station determination module comprises:
   a midamble code generator for generating midamble codes in the group when the comparison and decision module decides that slot synchronization and group acquisition is successful;
   a second correlator for detecting a correlation between the midamble codes generated from the midamble code generator and the received signals to output second correlation values; and
   a maximum value detector for detecting a maximum value of the second correlation values from the correlator to determine the base station to which the mobile station belongs.

8. The system as claimed in claim 1, wherein the comparison and decision module sends a command to the primary synchronization code search module to search the primary synchronization codes again, when slot synchronization and group acquisition is not successful.

9. A cell search method for a mobile station in a time division duplex system, comprising:
   (a) upon turning on power, the mobile station's searching for a base station to which it belongs, and searching primary synchronization codes for a predetermined search frame to determine a position of the maximum value during the search frame;
   (b) the mobile station's extracting M slots from the position of the maximum value determined in the step (a), searching and accumulating secondary synchronization codes for M slots, sorting, in the order of size, as many of the secondary synchronization codes as can be sorted in a predetermined buffer size per slot, and storing the sorted secondary synchronization codes;
   (c) determining a position of the maximum variable among the secondary synchronization code values accumulated in the step (b), and counting matching position values in the M slots having the maximum variables sorted in the order of size;
   (d) comparing the count value of the step (c) with a predetermined system value to decide whether slot synchronization and group acquisition is successful; and
   (e) searching midamble codes from the group determined by the secondary synchronization code search and detecting a maximum value of the midamble codes to determine the base station to which the mobile station belongs, only when slot synchronization and group acquisition is successful, wherein the mobile station searches primary and secondary synchronization codes during initial acquisition without determining a threshold value before entering checking mode to determine if synchronization is successful, and searches primary synchronization codes again when slot synchronization and group acquisition is not successful.

10. The method as claimed in claim 9, further comprising:
    (f) performing a primary synchronization code search again, when slot synchronization and group acquisition is not successful.

11. The method as claimed in claim 9, wherein the step (d) comprises:
    deciding that slot synchronization and group acquisition is successful, when the count value of the step (c) is equal to or greater than the system value; and
    deciding that slot synchronization and group acquisition is not successful, when the count value of the step (c) is less than the system value.

12. The method as claimed in claim 9, wherein the step (e) comprises:
    searching scramble codes from the midamble codes and demodulating broadcasting channels using the scramble codes.

13. The method as claimed in claim 12, wherein the step of demodulating the broadcasting channels comprises:
    performing a cyclic redundancy check (CRC) of the demodulated broadcasting channels to decide whether there is an error; and
    performing a primary synchronization code search again when there is an error, or deciding that the base station search is successful and ending the search process when there is no error.

* * * * *